(12) United States Patent
Guard et al.

(10) Patent No.: US 6,886,783 B2
(45) Date of Patent: May 3, 2005

(54) QUICK INSTALL INSULATION

(75) Inventors: Peter S. Guard, Sammamish, WA (US); Karen L. Hills, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/368,446

(22) Filed: Feb. 20, 2003

(65) Prior Publication Data

US 2004/0256520 A1 Dec. 23, 2004

(51) Int. Cl.[7] ................................................. B64C 1/40
(52) U.S. Cl. .................... 244/119; 52/506.05; 52/404.4
(58) Field of Search .......................... 244/117 R, 119, 244/129.1; 52/404.3, 404.4, 506.05, 506.08, 538, 539

(56) References Cited

U.S. PATENT DOCUMENTS

| | | | | |
|---|---|---|---|---|
| 3,029,910 A | * | 4/1962 | Kirk et al. ................... | 428/593 |
| 5,139,839 A | * | 8/1992 | Lim ............................. | 428/76 |
| 5,715,638 A | * | 2/1998 | Anderson, Sr. .......... | 52/506.08 |
| 6,068,907 A | * | 5/2000 | Beauregard .................. | 428/71 |
| 6,358,591 B1 | * | 3/2002 | Smith .......................... | 428/74 |

* cited by examiner

Primary Examiner—Robert P. Swiatek
(74) Attorney, Agent, or Firm—Davis & Kendall, PC; Tyrone Davis; John S. Kendall

(57) ABSTRACT

A method for quick insulating the interior skin of an airplane. The system includes a new design for the insulating blanket with permeable and impermeable membranes and a blanket "clip" allowing for cable pass-through. The method stabilizes blanket construction method, minimizes moisture retention and promotes a design based provisioning strategy to accommodate system run access to the airplane skin through a simplified interface detail. Both the insulation blanket and the blanket clip attach to the aircraft frame via a "zip-lock" attachment system, which consists of vertical rails with receiving detail to receive the (blanket and clip) zip-lock strips, and a cap strip that covers (and secures) the zip-lock strips. The invention solves the moisture retention and installation time and the quantity of Mylar® used to encapsulate the fiberglass material.

10 Claims, 6 Drawing Sheets

SHINGLING EFFECT OF INSULATION BLANKETS

QUICK INSTALL INSULATION

FIELD OF THE INVENTION

The invention relates to a method for quick insulating the interior skin of an airplane. The system includes a new design for the insulation blanket with permeable and impermeable membranes and a blanket "clip" allowing for cable pass-through. The method stabilizes blanket construction method, minimizes moisture retention and promotes a design based provisioning strategy to accommodate system run access to the airplane skin through a simplified interface detail.

Both the insulation blanket and the blanket clip attach to the aircraft frame via a "zip-lock" attachment system in which consists of vertical rails with receiving detail to receive the (blanket and clip) zip-lock strips, and a cap strip that covers (and secures) the zip-lock strips. The invention solves the moisture retention and reduces product weight and installation time and the quantity of Mylar® used to encapsulate the fiberglass material.

STATEMENT REGARDING FEDERALLY SPONSORED RESEARCH AND DEVELOPMENT

This invention was not developed as a result of federally sponsored research and development grants or contracts.

BACKGROUND OF THE INVENTION

The cabin compartment is the innermost area within the surrounding aluminum shell of the conventional aircraft fuselage. In flight, the aluminum shell is subject to extreme changes of temperature. To maintain a comfortable environment in the inhabited cabin compartment, a fuel efficient aircraft requires that the cabin compartment be substantially surrounded by thermal and acoustic insulating systems. Prior art insulation systems have been known to accumulate and retain hundreds of pounds of condensed moisture in flight. Such moisture saturated insulation blankets are ineffective insulators and detract from the fuel and payload efficiency of the aircraft. Existing thermal acoustic insulation in commercial transports is a labor intensive (fabrication and installation), multi-material assembly that has chronic problems with installation and water retention in service. Current thermal acoustic insulation for the airplane fuselage consists of multiple layers of fiberglass enclosed in a fabricated Mylar® bag. The construction of the insulation blankets is not consistent across airplane models with variations in film thickness, color, and fiberglass type. While the locations of related variations associated with different acoustic demands is a significant factor, the installation related variations due to provisioning have resulted in a high part count and significant efforts in developing configuration management scenarios to cope with the complexity.

Accordingly, all aircraft fuselage insulation blankets heretofore known suffer from a number of disadvantages: (a) Moisture vapor condensate tends to form on the blanket interior surfaces in flight. Insulation materials become matted down, wet and lose their loft, thickness and effective insulating properties. (b) Moisture vapor condensate is retained in the fibrous capillaries and yarn interstices of the conventional blanket's textile reinforcement. (c) The typical prior art blanket is not durable when subjected to actual flight conditions, including cycles of cold, heat, humidity, pressure, and unpredictable episodes of high altitude cosmic radiation over a period of time. The moisture barrier film and the adhesive or hardenable resinous material, particularly polyester type resinous materials and polyethyleneterepthalate film, can degrade, become brittle and the blankets-break open. (d) Sewn seams and thread bound projecting bundles of fibrous insulation wick moisture into the blanket. The remedial pressure sensitive adhesive tape, used to cover the stitches of sewn blanket seams, is too heavy and costly. Such taping adds weight and decreases the aircraft's payload capacity and fuel efficiency. (e) The prior art insulation blankets, when not sewn, require encasement materials having an added volume and weight of costly thermoplastic resinous material to improve heat sealability of seams. (f) The vents of prior art insulating blanket casings allow ingress of moisture laden air. (g) Such prior art insulation blankets are costly, occupy fuselage space, add weight, reduce payload capacity and, when dry, have a function limited to insulation and passenger comfort.

The zip-lock method of insulating the fuselage solves the moisture retention problem and reduces product weight and installation time and the quantity of Mylar® used to encapsulate the fiberglass material.

SUMMARY OF THE INVENTION

The invention relates to a method for insulating the interior skin of an airplane. The system includes a new design for the insulation blanket with permeable and impermeable membranes and a blanket "clip" that is installed along the top edge of the blanket allowing for cable pass-through. The method stabilizes blanket construction method, minimizes moisture retention and promotes a design based provisioning strategy to accommodate system run access to the airplane skin through a simplified interface detail.

Both the blanket and the blanket clip attach to the aircraft frame via a "zip-lock" attachment system that consists of vertical rails with receiving detail to receive the blanket and clip. Zip-lock strips and a cap strip cover and secure the zip-lock strips.

BRIEF DESCRIPTION OF THE DRAWINGS

The accompanying drawings, which are incorporated in and form part of the specification, illustrate an embodiment of the present invention and together with the description, serve to explain the principles of the invention. In the drawings.

DETAILED DESCRIPTION OF THE INVENTION

Figure 1:
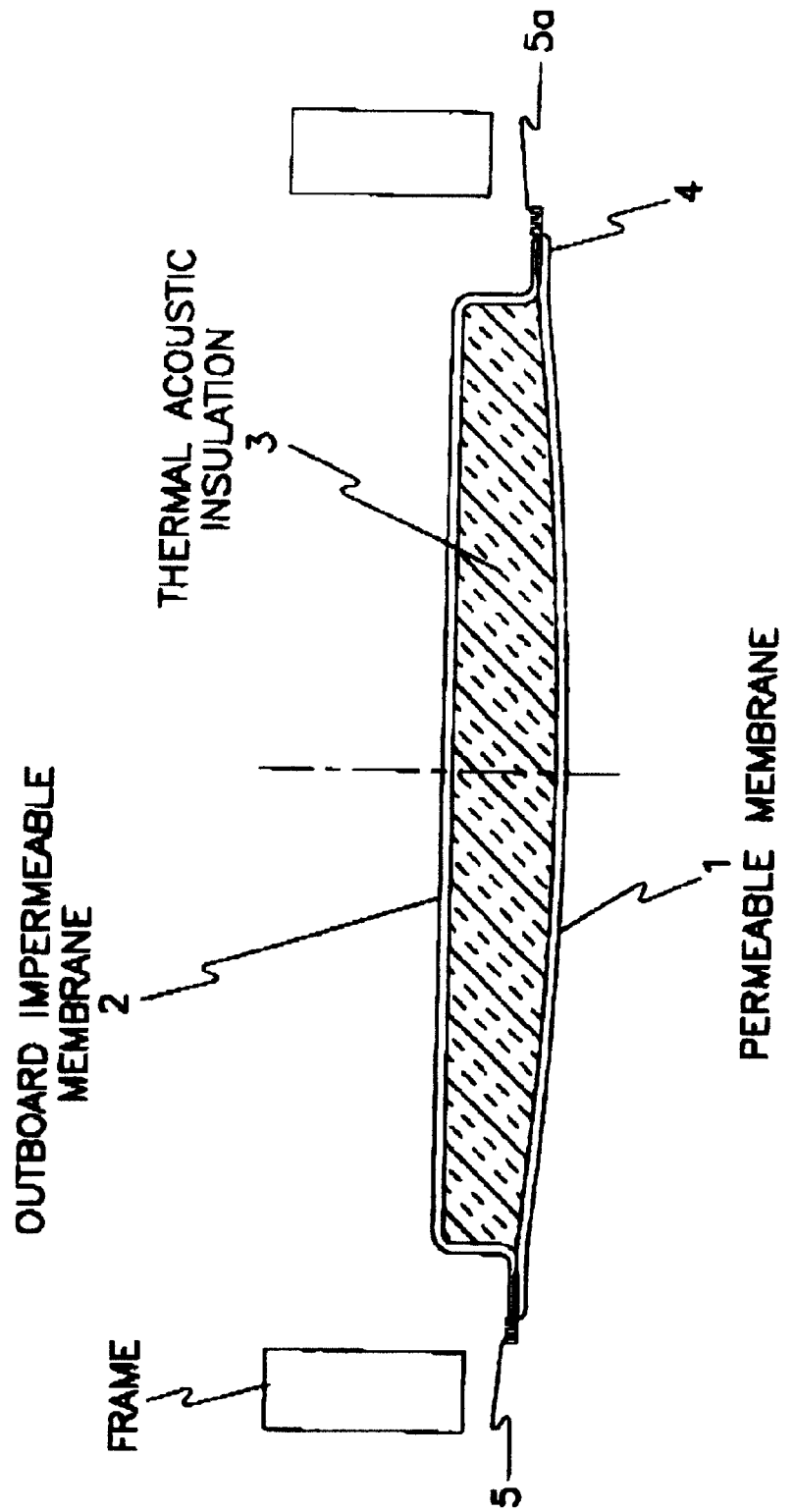
FIG. 1 show a detail of the invention.

The present invention relates to a method for insulating the interior skin of an airplane. The system includes a new design for the insulation blanket with permeable and impermeable membranes and a blanket "clip" allowing for cable pass-through. It uses premium fiberglass that is manufactured with a scrim that serves as the carrier film. As shown in FIG. 1, a permeable inboard membrane (1) is thermally fused or adhesively bonded to an impermeable outboard membrane (2) that becomes the outboard face of the blanket (3) to serve as the water barrier to divert condensate to the airplane bilge (not shown). The inboard permeable membrane (1) allows for free moisture vapor transport and therefore reduces the tendency for moisture retention in the blanket (3). Alternately, the inboard membrane (1) can be a porous moisture transport film therefore, if the dew point zone in the thermal insulation resulted in high levels of condensation in the blanket (3).

Figure 2:
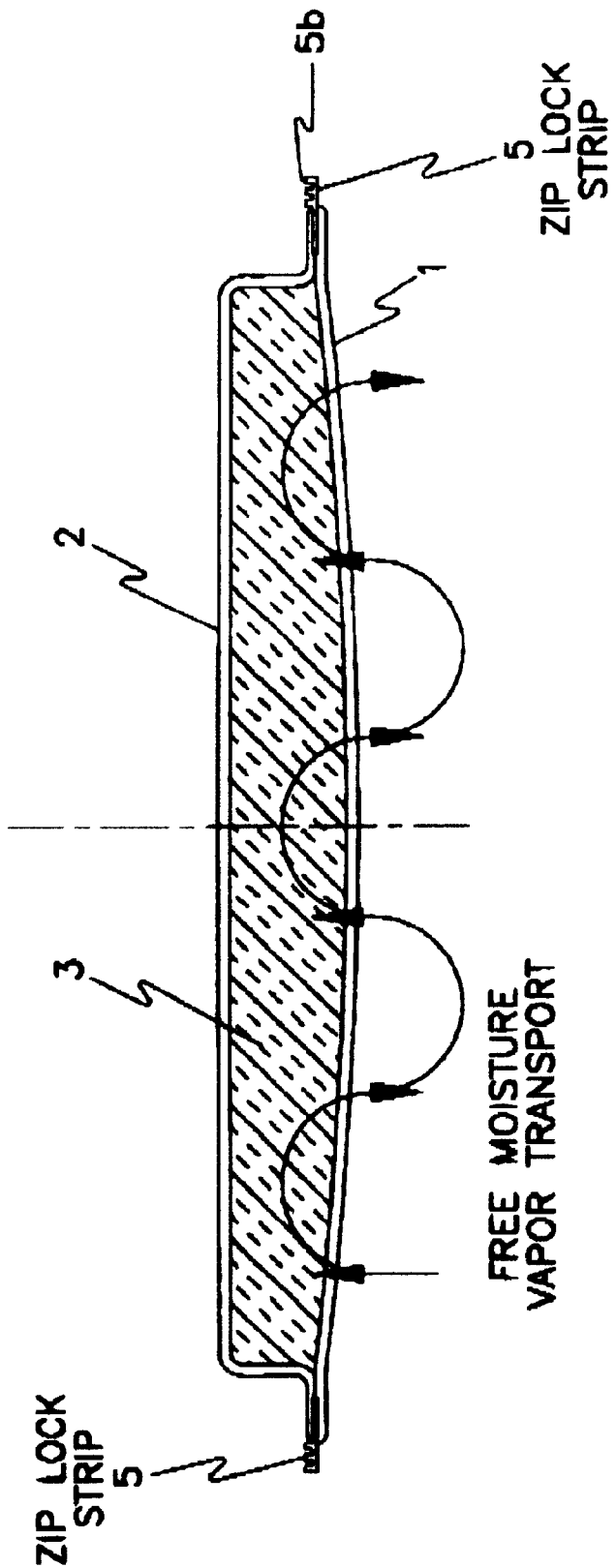
FIG. 2 shows a detail of the zip-lock interface.
Figure 3:
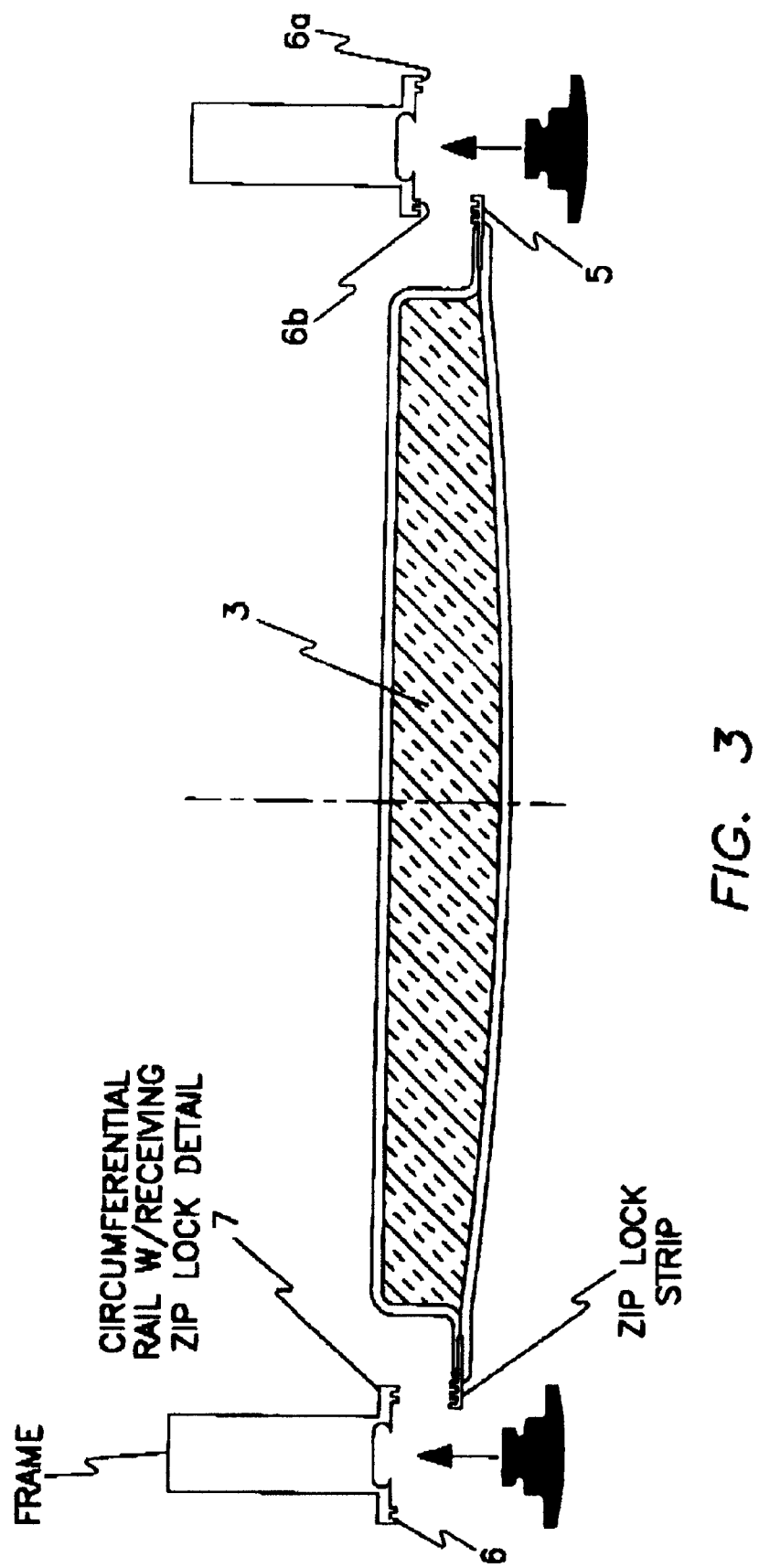
FIG. 3 shows another detail of the invention

Referring to FIGS. 2 and 3, the edge strip (4) of the blanket (3) is formed into a shape that would be similar to a zip-lock configuration or alternately, a zip lock strip (5). It has adhesive faces that are inserted between the open edges of the inboard membrane (1) and outboard membrane (2) during the blanket (3) fabrication process. The resulting strip blanket (3) is then installed into an airplane that is provisioned with circumferential c-channel rails (7) that have a receiving zip lock detail (6). The zip-lock configuration comprises a series of vertical members (5a) that rise perpendicular to the edge strip (5). The vertical members (5a) form receiving channels (5b) in the edge strip that mate with receiving sealing members (6a) in the receiving zip-lock detail (6). This configuration thus allows for the installation of blankets without any penetrations. This type of design and installation method improves the water management effectiveness without the associated complexity of current insulation practices.

Figure 4:
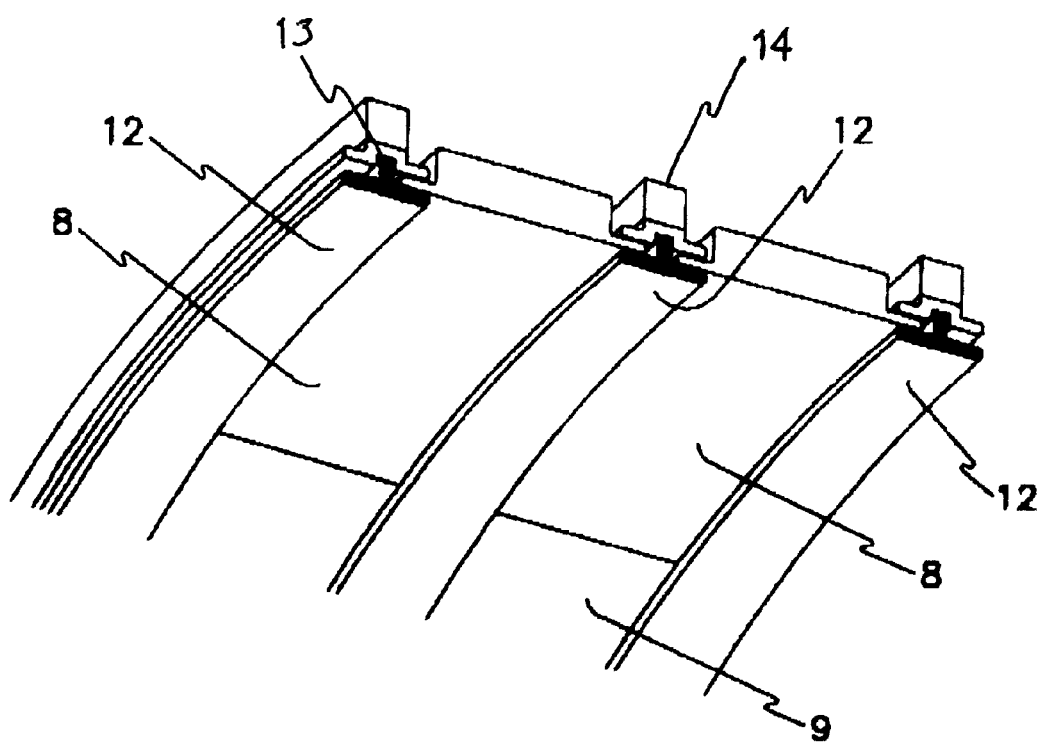
FIG. 4 shows a detail of an insulation bag with clip
Figure 5:
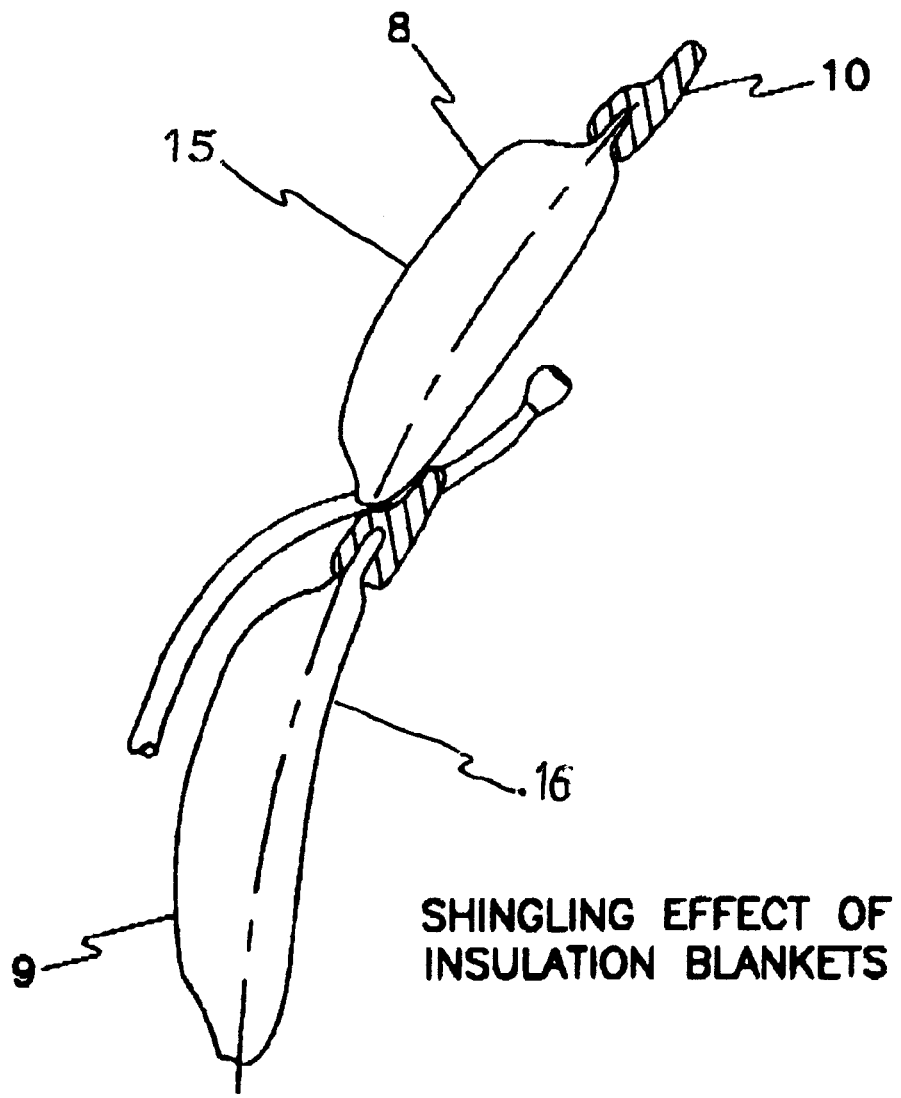
FIG. 5 shows the shingled effect of the insulation bags
Figure 6:
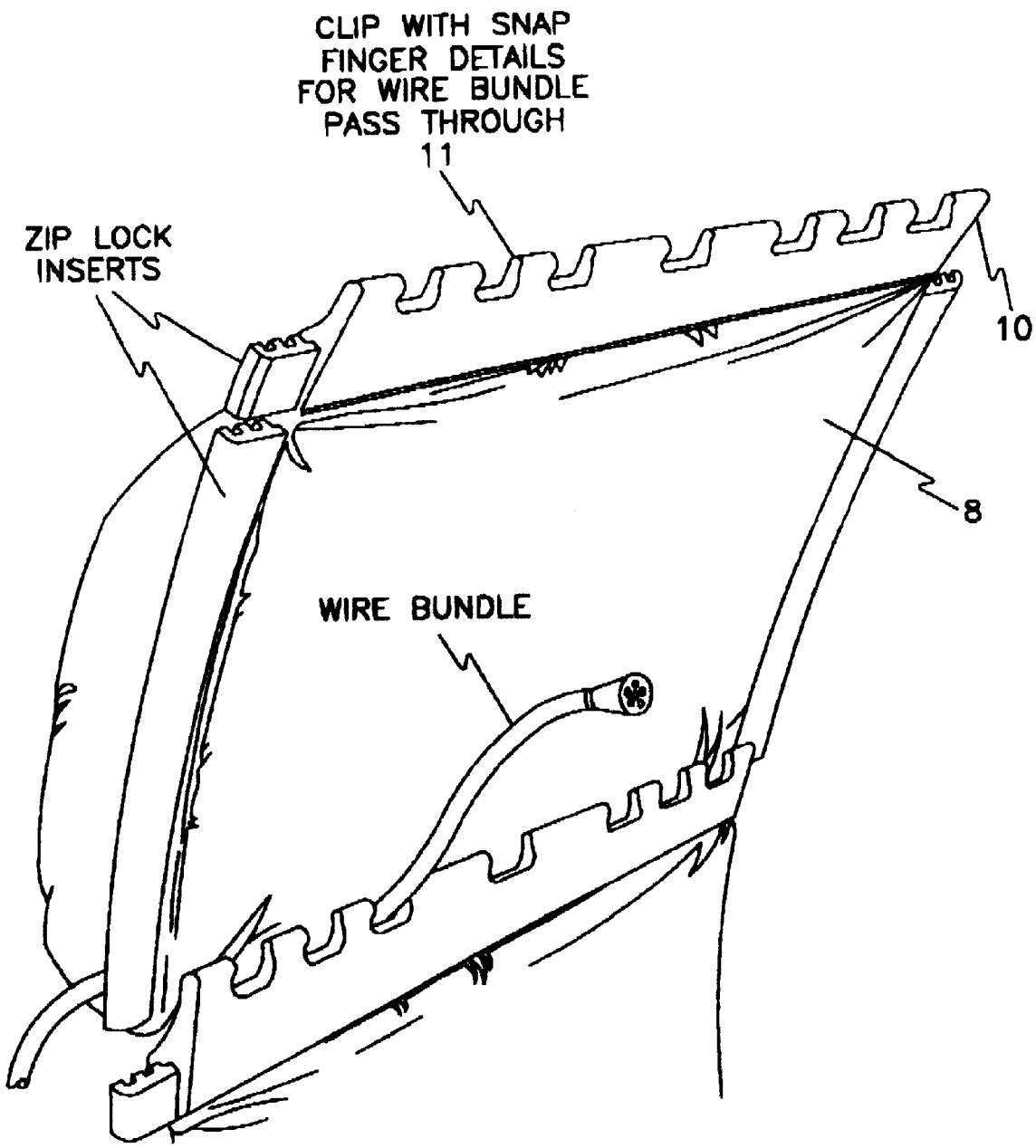
FIG. 6 shows the insulation bags secured.

As shown in FIGS. 4 and 5, accommodation for access to the interior skins is made by shingling the strip blankets (8 and 9) and installing a clip (10) that closes out the top of the blanket (8). Snap finger details (11) hold and locate wire harnesses that run outside of the insulation envelope. The clip (10) engages into the zip-lock detail (6) of the rails (7). The final component of the insulation system is the installation of a cap strip (12) made with semi-rigid thermal acoustic foam insulation with a T-shaped cross section (13) that inserts into the c-channel (14). The vertical leg of the T-shaped cross section (13) compression fits into the c-channel (14) and the horizontal cross of the T-shaped cross section (13) has, an adhesive backing that bonds to the zip-lock tab (5) of the adjacent insulation blankets. The cap strip (12) can be manufactured via an extrusion foam process. The cap strip (12) provides additional thermal and acoustic close out and secondary water management for any condensation running along the c-channel. The cap strip (12) can be trimmed during the assembly process to accommodate structure attachments in the c-channel (14).

The quick install method comprises a plurality of insulating blankets (8 and 9), arranged in a shingled effect around the circumference of the fuselage of an aircraft. Each insulating bag having outer (15) and inner (16) membranes fused together with a zip-lock strip (5) inserted between the edges. The cavity within the bags (8 and 9) is filled with insulating material. The fuselage has around its circumference c-channel receiving rails (7) modified to have a mating zip-lock edge (6) for receiving the zip-lock strip (5) of the insulating bags (8 and 9). Insulating bags (8 and 9) are fitted between the c-channel receiving rails (7) and a clip (10) is attached to one edge of the insulation bags and the zip-lock edge (6) of the c-channel rails securing the bags to the frame of the aircraft. The zip-lock edges (5 and 6) of the insulating bags (8 and 9) are mated and the cap strip (12) is placed in the c-channel (14) completing the insulation process. The snap finger detail (11) of the clip (10) allows easy access for wiring harness or tubing (15).

The invention has been described in detail with particular reference to certain preferred embodiments thereof, but it will be understood that variations and modifications can be effected within the spirit and scope of the invention.

Parts List

1. Permeable Inboard Membrane
2. Impermeable Outboard Membrane
3. Insulation Blanket
4. Edge Strip
5. Zip-Lock Strip
6. Rail Zip-Lock Detail
7. C-Channel Rails
8. Strip Insulation Blanket
9. Strip Insulation Blanket
10. Clip
11. Snap Finger Details of Clip
12. Cap Strip
13. T-Shaped Cross Section of Cap Strip
14. C-Channel
15. Wiring Harness The embodiments of the invention in which an exclusive property or privilege is claimed are defined as follows:

1. An insulation blanket for an aircraft fuselage having circumferential frame supports comprising:

an outboard membrane attached to an inboard membrane having at least three defined edges;

an edge strip fused between two edges of the outboard and inboard membranes, and said attached inboard and outboard membranes forming a cavity therebetween, said edge strip further comprising vertical members rising perpendicular to its surface and forming receiving channels;

an insulating material deposed within said cavity; and

A clip attached to one edge of said inboard and outboard membranes.

2. The insulation blanket as recited in claim 1 wherein said circumferential frame supports further comprise rails, said rails include a c-channel having receiving members rising from its surface, said receiving members mate with said receiving channels to form a seal.

3. The insulation blanket as recited in claim 2 wherein outboard membrane is an impermeable membrane.

4. The insulation blanket as recited in claim 3 wherein said inboard membrane is a permeable membrane that allows free moisture vapor transport.

5. The insulation blanket as recited in claim 4 wherein said clip further comprises receiving channels that engage said c-channel rails and complete a seal.

6. A method of insulating the fuselage of an aircraft comprising:

providing a support frame around the circumference of the fuselage;

attaching edge strips to said support frame;

providing a plurality of insulating blankets, said insulating blankets having an outboard membrane attached to an inboard membrane having at least three defined edges and attached along two of its edges to said edge strips; and a clip attached along the remaining edge of said insulating blanket.

7. The method as recited in claim 6 wherein said edge strip comprises vertical members rising perpendicular to its surface and forming receiving channels.

8. The method as recited in claim 7 wherein said framing supports further comprises rails, said rails include a c-channel having receiving members rising from its surface, said receiving members mate with said receiving channels to form a seal.

9. The method as recited in claim 8 wherein outboard membrane is an impermeable membrane and said inboard membrane is a permeable membrane that allows free moisture vapor transport.

10. The method as recited in claim 9 wherein said clip further comprises receiving channels that engage said c-channel rails and complete a seal.

* * * * *